United States Patent
Berge et al.

(10) Patent No.: US 10,255,448 B1
(45) Date of Patent: Apr. 9, 2019

(54) DATA SECURITY USING HIGH SPEED SERIAL EQUALIZATION

(71) Applicant: International Business Machines Corporation, Armonk, NY (US)

(72) Inventors: Layne A. Berge, Rochester, MN (US); Benjamin A. Fox, Rochester, MN (US); Wesley D. Martin, Elgin, MN (US); George Zettles, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/730,289

(22) Filed: Oct. 11, 2017

(51) Int. Cl.
| | |
|---|---|
| *H03H 7/40* | (2006.01) |
| *G06F 21/60* | (2013.01) |
| *H04L 29/06* | (2006.01) |
| *H04L 25/03* | (2006.01) |

(52) U.S. Cl.
CPC ...... *G06F 21/606* (2013.01); *H04L 25/03828* (2013.01); *H04L 63/0428* (2013.01)

(58) Field of Classification Search
CPC ......... H04L 25/03038; H04L 25/03133; H04L 25/03343; H04L 1/0047; H04B 17/309; H04B 1/00
USPC .................. 375/232, 229, 233; 708/322, 323
See application file for complete search history.

(56) References Cited

U.S. PATENT DOCUMENTS

| | | |
|---|---|---|
| 6,377,640 B2 | 4/2002 | Trans |
| 6,904,110 B2 | 6/2005 | Trans et al. |
| 8,548,038 B2 | 10/2013 | Sindalovsky et al. |
| 8,896,956 B1 | 11/2014 | Nangare et al. |
| 2005/0254569 A1 | 11/2005 | Momtaz |
| 2006/0067440 A1 | 3/2006 | Hsu et al. |
| 2008/0260016 A1 | 10/2008 | Lapointe et al. |

(Continued)

FOREIGN PATENT DOCUMENTS

| | | |
|---|---|---|
| CN | 101581734 A | 11/2009 |
| CN | 101581734 B | 3/2014 |
| EP | 1748611 A1 | 1/2007 |

OTHER PUBLICATIONS

Huang et al., "Training-Sequence-Indifferent Decision-Feedback Equalizer," Printed Oct. 5, 2017, 4 pages http://web.mit.edu/6.111/www/f2010/projects/yhuang9_Project_Proposal.pdf.

(Continued)

*Primary Examiner* — Khai Tran
(74) *Attorney, Agent, or Firm* — Nolan M. Lawrence (57) ABSTRACT

A system includes a transmit equalizer to equalize a data stream using a set of transmit parameters to generate an input signal. The system further includes a communication channel to receive the input signal. The system further includes a receive equalizer to receive an output signal from the communication channel in response to the input signal and detect the data stream from the output signal using a set of receive parameters. The system additionally includes a controller to change the set of transmit parameters in response to a condition, where the transmit parameters, the receive parameters, and the condition are selected to both enable the receive equalizer to detect the data stream from the output signal and reduce the likelihood of an external circuit detecting the data stream from the output signal.

5 Claims, 9 Drawing Sheets

(56) References Cited

U.S. PATENT DOCUMENTS

2012/0257652 A1* 10/2012 Malipatil ............ H04L 7/0062
                                                    375/219
2016/0041938 A1*  2/2016 Ishii ................. G06F 13/4282
                                                    710/313
2016/0164703 A1   6/2016 Stone et al.

OTHER PUBLICATIONS

International Search Report, International App. No. PCT/IB2018/057711, File Reference AUS820160730, dated Jan. 30, 2019, 9 pages.

* cited by examiner

| Txlev | Manual | 400 mV |
| --- | --- | --- |
| FFE | 3-tap | [0.684,-0.100,0.031] |
| DFE | 3-tap | [-0.562,-0.251,-0.140] |
| AGC | Automatic | |

| Txlev | Manual | 200 mV |
| --- | --- | --- |
| FFE | 3-tap | [0.685,-0.285,0.031] |
| DFE | 3-tap | [-0.131,-0.064,-0.062] |
| AGC | Automatic | |

DATA SECURITY USING HIGH SPEED SERIAL EQUALIZATION

BACKGROUND

The present disclosure relates to signal processing, and more specifically, to providing data security using equalization in a high speed serial communication channel.

Computing systems be constructed using components parts produced by disparate manufactures. Some of these manufactures can have protectable intellectual property rights or interests in these components even after the components are installed in a computing system owned by another party. The intellectual property can include, for example, the algorithms implemented in a component, a communication protocol used to interact with the component, and data produced or received by the component. Additionally, a manufacturer of a given system component can be tasked with ensuring that data or other intellectual property exchanged between components within a computing system is secure from unauthorized third party access. In some cases, the intellectual property associated with a given component installed in a computing system must be protected against unauthorized access by entities having physical access to the computing system.

One technique that can secure components (or the intellectual property associated with a component) of a computing system is to prevent physical intrusion into the component or into a portion of the computing system that exposes the component or the component's intellectual property. Unauthorized entities having physical access to a computing system, however, can obtain data from a protected component by directly probing a printed circuit board (PCB) coupling the component to the computing system. The captured data can be analyzed to discover protected intellectual property. Encryption is one technique currently used to address this issue. The intellectual property associated with a component can be protected by, for example, encrypting data before it is transmitted to a communication channel on the way to, or on the way from, the protected component. Encryption, however, only delays the compromise of the intellectual property. The availability of increasingly powerful computers, along with back-door and side-band attacks on encryption algorithms means that encryption alone cannot guarantee the security of protected components.

SUMMARY

According to embodiments of the present disclosure, a system includes a transmit equalizer to equalize a data stream using a set of transmit parameters to generate an input signal. The system further includes a communication channel to receive the input signal. The system further includes a receive equalizer to receive an output signal from the communication channel in response to the input signal and detect the data stream from the output signal using a set of receive parameters. The system additionally includes a controller to change the set of transmit parameters in response to a condition, where the transmit parameters, the receive parameters, and the condition are selected to both enable the receive equalizer to detect the data stream from the output signal and reduce the likelihood of an external circuit detecting the data stream from the output signal.

According to various embodiments of the present disclosure, a method includes equalizing a data stream using a set of transmit parameters to generate an input signal. The method further includes transmitting the input signal to a communication channel. The method additionally includes receiving an output signal from the communication channel in response to the input signal and detect the data stream from the output signal using a set of receive parameters. The method then includes changing the set of transmit parameters and the receive parameters in response to a condition, where the transmit parameters, the receive parameters, and the condition are selected to both enable the receive equalizer to detect the data stream from the output signal and reduce the likelihood of an external circuit detecting the data stream from the output signal.

According to various embodiments of the present disclosure, a system includes a transmit equalizer to transmit an input signal having serial data to a communication channel, the input signal equalized in response to transmit equalizer parameters to cause an output signal detected from the communication channel in response to the input signal to have a distortion level greater than a minimum distortion level, the transmit equalizer parameters having values that change in response to a condition. The system additionally includes a receive equalizer to receive the output signal from the communication channel and to process the received output signal to retrieve the serial data, the receive equalizer parameters selected in response to the transmit equalizer parameters to reduce the distortion level.

According to various embodiments of the present disclosure, a method includes equalizing serial data to provide an input signal to a communication channel in response to at least two sets of transmit equalizer parameters, the at least two sets of transmit equalizer parameters selected to cause an output signal detected from the communication link in response to the input signal to have signal quality less than a threshold signal quality. The method further includes receiving the output signal from the communication channel. The method additionally includes processing the output signal using a set of receive equalizer parameters to retrieve the serial data, the receive equalizer parameters selected to cause the signal quality to be greater than the threshold signal quality.

According to various embodiments of the present disclosure, a system includes a transmit equalizer to equalize a data stream using a set of transmit parameters to generate an input signal; a communication channel to receive the input signal; a receive equalizer to receive an output signal from the communication channel in response to the input signal and detect the data stream from the output signal using a set of receive parameters; and a controller to change an amplitude of the input signal in response to a condition, wherein the amplitude of the input signal and the condition enable the receive equalizer to detect the data stream and reduce the likelihood of an external circuit detecting the data stream.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to signal processing, more particular aspects relate to providing data security using equalization in a high speed communication channel. While the present disclosure is not necessarily limited to such applications, various aspects of the disclosure may be appreciated through a discussion of various examples using this context.

Components of a computing system can be coupled together by a communication channel. The communication channel can be a physical bus on a printed circuit board (PCB) configured to transmit a signal from a transmitter (e.g., a first component of the computing system) to a receiver (e.g., a second component of the computing system). An entity having physical access to the computing system can intercept, or acquire, data communicated from the transmitter to the receiver by, for example, probing physical traces of the PCB to receive the transmitted signal. The received signal can be processed by one or more conditioning circuits to recover the transmitted data. Data transmitted over a communication bus can be protected from access by an unauthorized entity by encrypting the data before transmitting it over the communication channel. The protection offered by encryption, however, is limited as it only delays discovery of the transmitted data by an unauthorized entity. An entity with sufficient time and resources can employ one or more exploits of a given cryptographic algorithm to eventually gain access to the transmitted data. A data security solution that protects data transmitted over a communication channel, while not being not susceptible to the weakness of encryption, can enable or improve the secure integration of disparate components into computing systems.

Embodiments of the present disclosure are based on the recognition that equalization in a transmitter coupled to a communication channel can be used to defend, or secure, a communication channel against outside intrusion (e.g., detection, discovery, or acquisition by an unauthorized third party). The coefficients, or weights, of an equalizer in a transmitter (e.g., a transmit equalizer) can be changed, or varied, between sets of non-optimal coefficients to change the signal quality present in a communication channel to defend against outside detection. An equalizer having the varying coefficients can operate on a data stream to generate a channel input signal having characteristics (e.g., frequency components) that are determined in response to the varying coefficients. The channel input signal can be transmitted over the communication channel to a receiver circuit. The characteristics of the communication channel (e.g., the impulse response of the communication channel) can operate on the transmitted signal to cause an output signal probed, or sampled, at an interface between the receiver and the communication channel (and at other points along the communication channel) to be difficult to capture.

The changing characteristics of an input signal can cause an eye-diagram of a sampled output signal generated in response to the input signal to have a closed eye. The closed eye diagram, coupled with the rate of change of the characteristics of the input signal, can limit the ability of a circuit operated by an unauthorized entity to detect or discover a data stream used to generate the input signal. An equalizer in a receiver circuit (e.g., a receive equalizer) configured with coefficients that correspond to, or are synchronized with, the changing coefficients of the transmit equalizer can open the eye in a closed eye diagram in the output signal to enable the data stream to be detected.

Embodiments of the present disclosure are further based on the recognition that varying the amplitude (e.g., the transmit level) of a signal transmitted over a communication channel while using a receiver equalizer having coefficients selected to correspond with the amplitude variations can defend the communication channel against outside detection. The changing amplitude of the transmitted signal, coupled with the operation of the channel characteristics on the transmitted signal, can make it difficult for an external circuit or equalizer to train to an output signal detected from the channel in response to the transmitted signal. A receiver equalizer, however, can readily train to, and detect, the transmitted signal using the selected equalizer coefficients.

As used herein, a communication channel can be a physical transmission medium used to convey an information carrying signal (e.g., a voltage, an electrical current, radio waves, or an optical stream). Examples of a physical transmission medium include a wire, a metallic trace on a circuit board, and a fiber optic cable. A channel input signal can be transmitted to a communication channel, while an output signal can be sampled or received from the communication channel. The sampled or received output signal can be a function of both the input signal and the channel characteristics of the communication channel. Channel characteristics can include an impulse response (or, alternatively, the frequency response) of the communication channel. The communication channel characteristics can operate on, or can be convolved with, an input signal to generate the output signal. In some environments, the channel characteristics can cause the output signal to be a degraded or distorted version of the input signal.

As used herein, an equalizer can be an electronic circuit, or a logical structure (e.g., a computer program, model, or algorithm), configured to reverse distortion incurred by a signal transmitted through a communication channel. An equalizer, for example, can be configured to remove inter-symbol interference from a transmitted signal to enable recovery of data transmitted by in the signal. Some equalizers can be implemented as a finite impulse response filter (e.g., a linear filter). One example of an FIR equalizer is a feed-forward equalizer (FFE). The feed-forward equalizer can be located in a transmitter to adjust the energy or frequency components of a signal before it is transmitted to a communication channel to counter the distortions in the transmitted signal caused by the channel characteristics of the communication channel. A second example of an FIR equalizer is a decision feedback equalizer (DFE). The DFE can be located in a receiver to modify an FIR equalizer by feeding back decisions made about past symbols in a signal to the input of the equalizer. A DFE can operate on a signal received or sampled signal from the communication channel to reverse distortions caused by the channel characteristics.

As used herein, equalizer coefficients are parameters of an equalizer (or parameters of an FIR filter) that determine the response of the equalizer to an input signal. Optimal equalizer coefficients of an FFE can be selected to minimize distortion caused by channel characteristics of a communication channel. Similarly, optimal equalizer coefficients of a DFE can be determined to reverse a maximum amount of distortion caused by channel characteristics in an output signal.

As used herein, the term "couple" or "coupled" includes indirect and direct electrical connection. Thus, if a first device is coupled to a second device, that connection may be through a direct electrical connection, or through an indirect electrical connection via other devices and connections.

Figure 1:
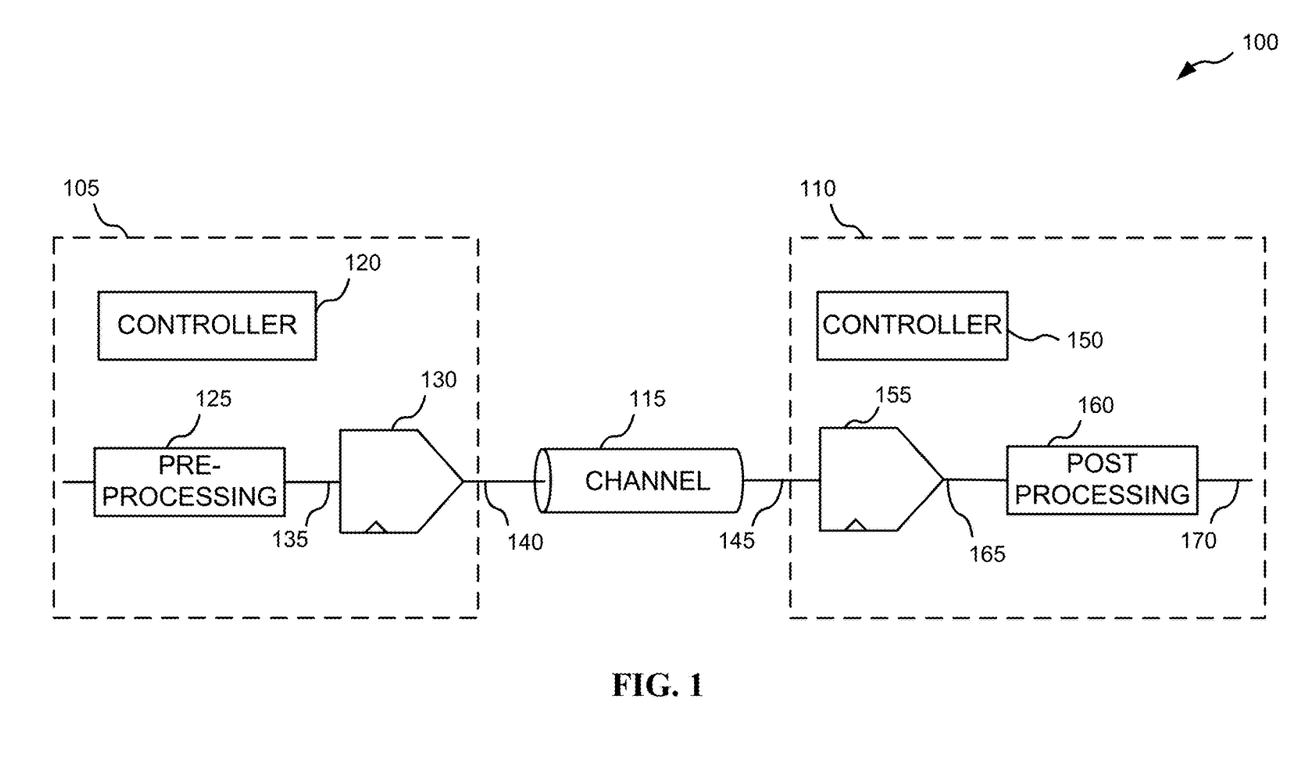
FIG. 1 depicts a block diagram of components of a system for providing data security using high speed serial equalization, according to various embodiments.

Turning now to the figures, FIG. 1 depicts a block diagram of components of a system 100 for providing data security using high speed serial equalization, according to various embodiments. The system 100 can include a transmit component 105, a receive component 110, and communication channel 115. In some embodiments, the system 100 can be a subsystem of a computing device. The system 100 can be configured to receive, process, and generate data in response to, for example, computer executable code executing on the computing device. A controller 120 and a controller 150 can orchestrate the receiving, processing and generating of data in the system 100. Although the controller 120 and the controller 150 are shown as subcomponents of the transmit component 105 and the receive component 110 respectively, the controllers can be separate from these components. In some embodiments the controller 120 and the controller 150 can be part of a different subsystem of a computing device than the system 100. Each component, subcomponent within a component, and subsystem of the system 100 can communicate or otherwise exchange data and other information physically though physical communication channels (e.g., through electrical traces, wires and optical fiber connected to, or associated with, one or more PCBs).

In some embodiments, the transmit component 105 can be at least a part of a transmitter portion of one or more components of a computing device. The transmit component 105, for example, can be part of an accelerator or co-processor configured to execute data encryption, data compression, or other signal processing functions. The transmit component 105 can include the controller 120, a pre-processing component 125, and a transmitter equalizer (e.g., a feed-forward equalizer) 130.

The controller 120 can include circuits, firmware and software components to enable the system 100 to receive data at pre-processing component 125 and equalize the received data using transmit equalizer 130 to generate an input signal to transmit to communication channel 115. In some embodiments, the controller 120 can store one or more sets of equalizer coefficients for configuring the transmit equalizer 130. The equalizer coefficients can be preselected (e.g., predetermined) and stored in a memory associated with the controller 130. In some embodiments the coefficients can be stored in another memory associated with other components of the system 100. The equalizer coefficients can be determined by analyzing the channel characteristics of the communication channel 115 and using these characteristics to, for example, train a model or physical transmit equalizer circuit. The model or physical transmit equalizer circuit can be trained to equalize a data stream to cause an output signal received from the communication channel 115, in response to an input signal generated by the transmit equalizer, to have at least a threshold distortion level (e.g., a minimum distortion level). In some embodiments, the threshold distortion level can be a distortion level that closes the eye of an eye diagram generated from the received output signal. In certain embodiments, the threshold distortion level is greater than a minimum distortion level in an output signal received from a communication channel in response to an input signal generated by a transmit equalizer having optimal equalizer coefficients. One or more sets of equalizer coefficients (e.g., sub-optimal or non-optimal coefficients) can be learned or derived from training the model according to this criteria.

According to various embodiments, the threshold distortion level can be selected to reduce the likelihood that a circuit or structure external to the system 100 can be trained to an output signal received from a communication channel. The output signal can be generated in response to an input signal generated by a transmit equalizer having coefficients learned using the threshold distortion level. Reducing the likelihood that an external circuit or structure can be trained to the output signal can include increasing that amount of time needed to for the external circuit or structure to train to the output signal.

The controller 120 can configure (e.g., program) the transmit equalizer 130 with a first set of equalizer coefficients and enable the transmit equalizer to process a first portion of a serial data stream produced by pre-processing component 125. The controller 120 can then configure the transmit equalizer, in response to a condition or trigger event, with subsequent sets of equalizer coefficients to enable to transmit equalizer to process subsequent portions of the serial data stream. In some embodiments, the controller 120 can continuously change, in response the condition or triggering event, the set of equalizer coefficients used by the transmit equalizer while the transmit equalizer processes the serial data.

In some embodiments, the controller 120 can configure the transmit equalizer, or an amplifier circuit (not shown), to change the amplitude of an input signal 140 transmitted to the channel 115 in response to a condition or triggering event. In some embodiments, the controller 120 can continuously change, in response the condition or triggering event, the amplitude of the transmitted signal 140. In certain embodiments, the controller 120 can store a set of predetermined amplitudes in a memory associated with the system 100. In these embodiments, the controller 120 can program the amplitude of input signal 140 to each of the predetermined amplitudes in response to can condition or triggering event. The controller 120 can continuously cycle through the set of amplitudes while the component 105 processes a data stream.

The input signal amplitudes and the condition or triggering event can be selected to enable a receive equalizer (e.g., the receive equalizer 155), configured with a set of corresponding equalizer coefficients, to detect the data stream transmitted by the input signal while reducing the likelihood of a circuit external to the system 100 detecting the transmitted data. Changing the amplitude of input signal 140 can include changing a gain of the transmit equalizer 130 or the gain of another circuit configured to transmit the input signal to the communication channel 115.

According to various embodiments, the condition or triggering event can be the expiration of a time interval or period. The controller 120 can, for example, configure the transmit equalizer with a different set of equalizer coefficients at 100 microsecond intervals. In some embodiments, the condition or triggering event can be the equalization, or processing, of at least a portion of a data stream 135. The controller 120 can, for example, configure the transmit equalizer 130 with a new or different set of equalizer coefficients after the transmit equalizer has processed a threshold number of a data units from a data stream using a first set of equalizer coefficients. The transmit equalizer 130, for example, can be configured to with a different or new set of equalizer coefficients after the transmit equalizer equalizes 1024 bits of data from a data stream.

According to various embodiments, the condition or triggering even can be selected based on a data stream being equalized, the channel characteristics of communication channel 115, and the equalizer coefficients, to reduce the likelihood of a circuit external to the system 100 detecting data in an output signal received from the communication channel 115. A period for changing the coefficients of the transmit equalizer 130 can be selected to be shorter than the time required for an equalizer external to the system 100 to learn a set of coefficients to process an output signal retrieved from the channel 115.

In some embodiments, the component 105 can include preprocessing component 125. The preprocessing component 125 can include one or more circuits configured to receive a data stream in a particular format and covert it to a format suitable for processing by the transmit equalizer 130. The preprocessing component 125 can, for example, receive parallel data and convert it to serial data before transmitting to transmit equalizer 130.

The transmit equalizer 130 can be an electronic circuit or data structure configured to receive a data stream 135 and generate a signal 140 (e.g., a channel input signal) in response the data stream. In some embodiments, the transmit equalizer 130 can transmit the signal 140 to the communication channel 115. The received data stream 135 can be a data stream containing data is particular format. The data stream 135, for example, can be a serial stream of binary data (e.g., a serial bit stream). The transmit equalizer 130 can include one or more circuits for operating on the data stream 135 to, for example, condition (e.g., equalize) a signal, including at least a portion of the data stream, to reduce or counter distortions caused channel characteristics of the channel 115.

Figure 3:
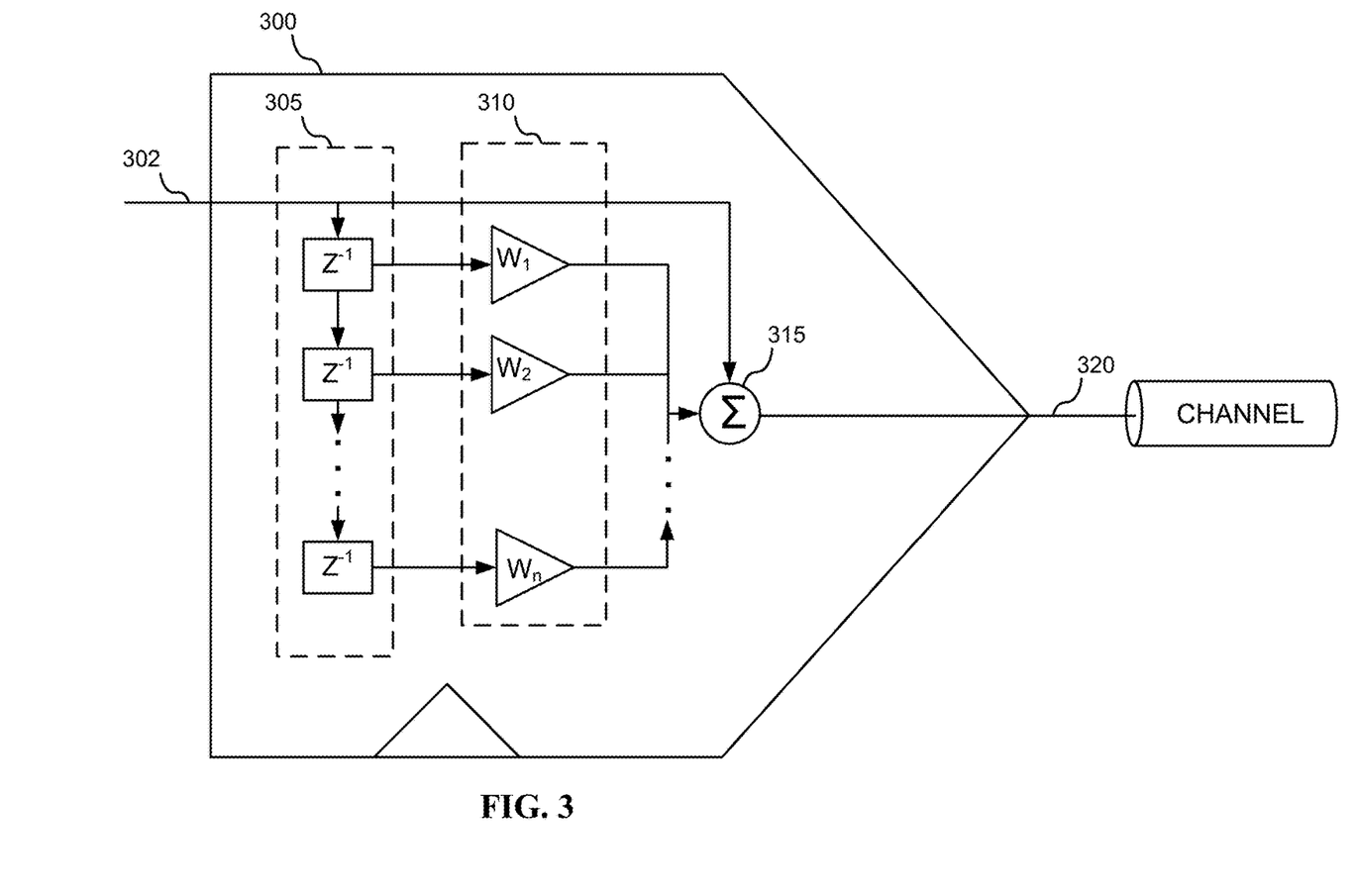
FIG. 3 depicts a diagram of an example feed-forward equalizer, according to various embodiments.

In some embodiments, the transmit equalizer 130 can be a feed-forward equalizer having two or more configurable (e.g., programmable) equalizer coefficients. The transmit equalizer 130, for example, can be the same as, or substantially similar to, the transmit equalizer 300 (FIG. 3). The equalizer coefficients can include weights of two or more taps of the feed-forward equalizer.

The communication channel 115 can be a high speed communication channel configured to receive an input signal 140 and generate an output signal 145 in response to the input signal. Examples of high speed communication channels include the Serial Advanced Technology Attachment bus (SATA™), the Universal Serial Bus (USB), and Peripheral Component Interconnect (PCI™) bus and its variants, such as PCI Express™ (SATA is registered trademark of the Serial Ata International Organization, PCI and PCI Express are registered trademarks of the PCI Special Interest Group). The input signal 140 can be received from the transmit equalizer 130 or another subcomponent of the component 105. The output signal 145 can be a function of the input signal 140 and the channel characteristics of the communication channel 115. In some embodiments, the output signal 145 can be sampled by the receiving component 110. In some embodiments, a circuit external to the system 100 can be coupled to one or more points along the communication bus 115 to sample or capture the output signal 145.

In some embodiments, the receive component 110 can be at least a part of a receiver portion of one or more components of a computing device. The receive component 110, for example, can be part of an accelerator or co-processor configured to execute data encryption, data compression, or other signal processing functions. The receive component 110 can include the controller 150, receive equalizer (e.g., a decision feedback equalizer) 155, and post-processing component 160.

The controller 150 can include circuits, firmware and software components to enable the system 100 to receive an output signal 145 at receive equalizer 155 and operate on the received output signal to generate a processed signal 165. In some embodiments, the processed signal 165 can be a data stream contain substantially the same as the data stream 135.

The controller 150 can store one or more sets of equalizer coefficients (e.g., receive equalizer coefficients or tap weights) for configuring the receive equalizer 155. The equalizer coefficients can be predetermined and stored in a memory associated with the controller 150 or in a memory associated with other components of the system 100. The receive equalizer coefficients can be determined by analyzing the channel characteristics of the communication channel 115 and using these characteristics to, for example, train a model or physical receive equalizer circuit. The model or physical receive equalizer circuit can be trained to equalize the output signal 145 to remove distortions caused by the communication channel 115. Training the receive equalizer 155 can include determining equalizer coefficients to cause the receive equalizer to process the output signal 145 to cause an eye diagram generated from the processed signal 165 to have an open the eye. Opening the eye of the eye diagram can enable the system 100 to make a correct decision or prediction regarding to the value of at least a threshold number of symbols in the processed signal 165. One or more sets of equalizer coefficients can be learned or derived from training the model or the physical receive equalizer circuit according to this criteria.

In some embodiments, a new or different set of receive equalizer coefficients can be learned for each corresponding set of transmit equalizer coefficients used to configure the transmit equalizer 130 to generate the input signal 140. In certain embodiments, a single set of receive equalizer coefficients can be learned for two or more sets of transmit equalizer coefficients. In other embodiments, a new set of equalizer parameters can be learned for at least one amplitude setting of the input signal 140.

The controller 150 can configure the receive equalizer 155 with a set of receive equalizer coefficients to match a corresponding set of transmit equalizer coefficients used to configure the transmit equalizer 130. A set of receive equalizer coefficients can correspond to a set of transmit equalizer coefficients when the set of receive equalizer coefficients enable the receive equalizer to process the output signal 145 to retrieve the processed signal 165 corresponding to the data stream 135.

In some embodiments, the controller 150 can configure the receive equalizer 155 with a set of receive equalizer parameters to match a corresponding amplitude setting for the input signal 140.

Setting the receive equalizer coefficients to match the transmit equalizer coefficients can include changing the receive equalizer coefficients in response to the same condition or triggering event used to change the transmit equalizer coefficients.

Figure 4:
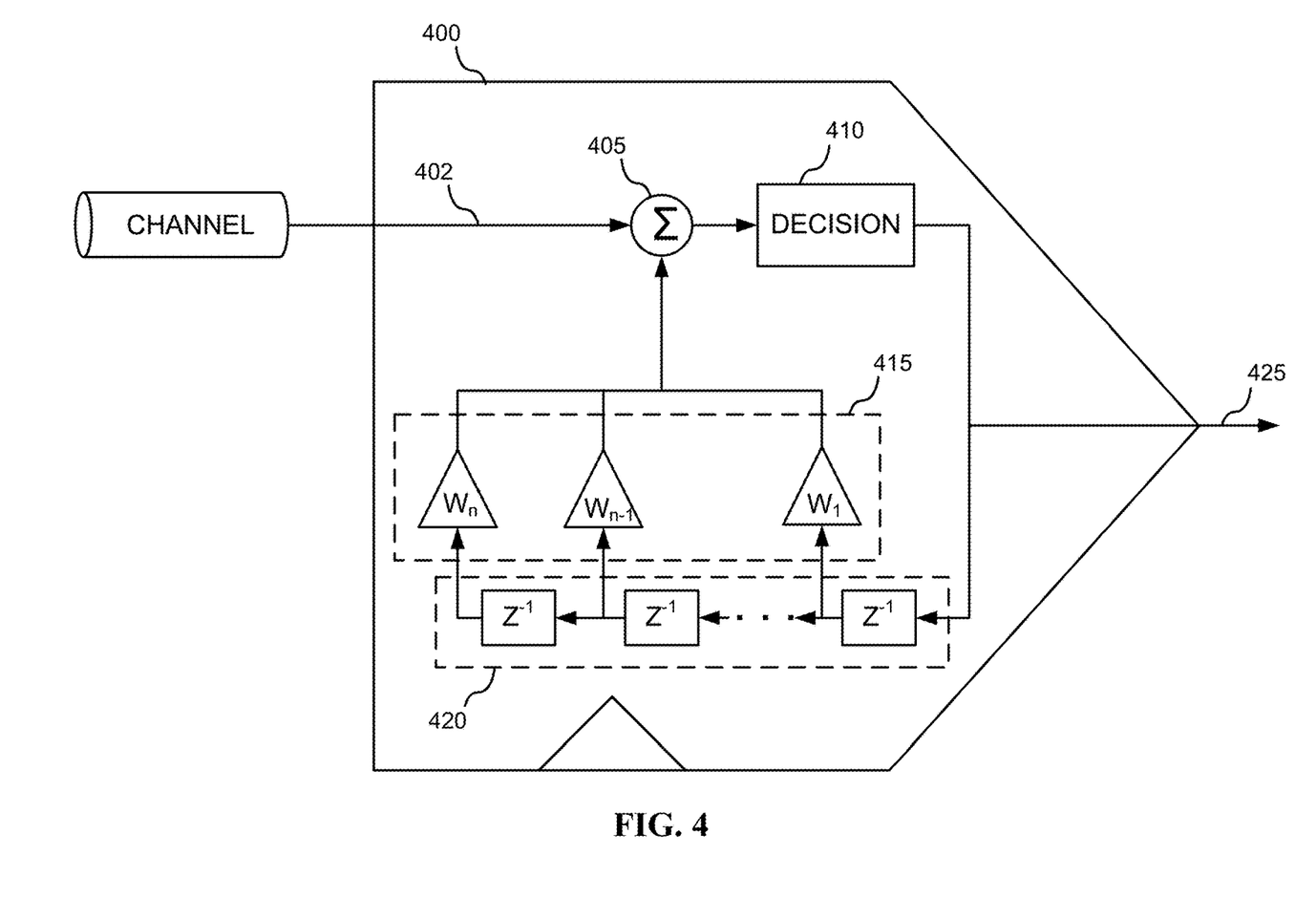
FIG. 4 depicts a diagram of an example decision feedback equalizer, according to various embodiments.

In some embodiments, the receive equalizer 155 can be a decision feedback equalizer having two or more configurable (e.g., programmable) equalizer coefficients. The receive equalizer 155, for example, can be the same as, or substantially similar to, the decision feedback equalizer 400 (FIG. 4). The equalizer coefficients can include weights of two or more taps of the decision feedback equalizer.

In some embodiments, receive component 110 can include post-processing component 160. The post-processing component 160 can include one or more circuits configured to receive processed signal 165 in a particular format (e.g. serial) and convert it a second format (e.g., parallel). In some embodiments, post-processing component 160 can execute additional processing on received data stream 165 to generate a processed data stream 170.

Figure 2A:
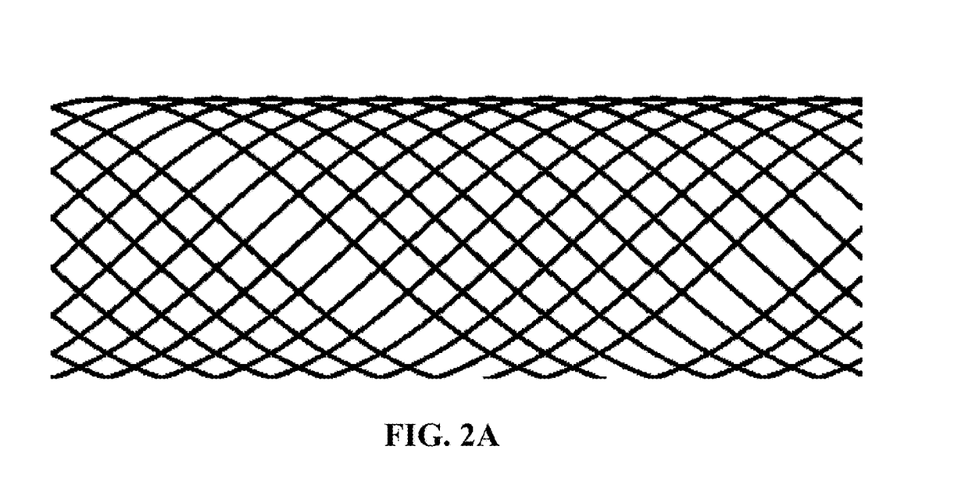
FIG. 2A depicts a diagram of an output signal, generated in response to an equalized input signal from a communication channel, at an input of a receiver circuit, according to various embodiments.

FIG. 2A depicts a diagram of an output signal generated in response to an equalized input signal from a communication channel at an input of a receiver circuit, according to various embodiments. The output signal can be the output signal 145 (FIG. 1), while the receiver circuit can be the receive component 110. The diagram shown in FIG. 2A can be an eye diagram having a closed eye.

Figure 2B:
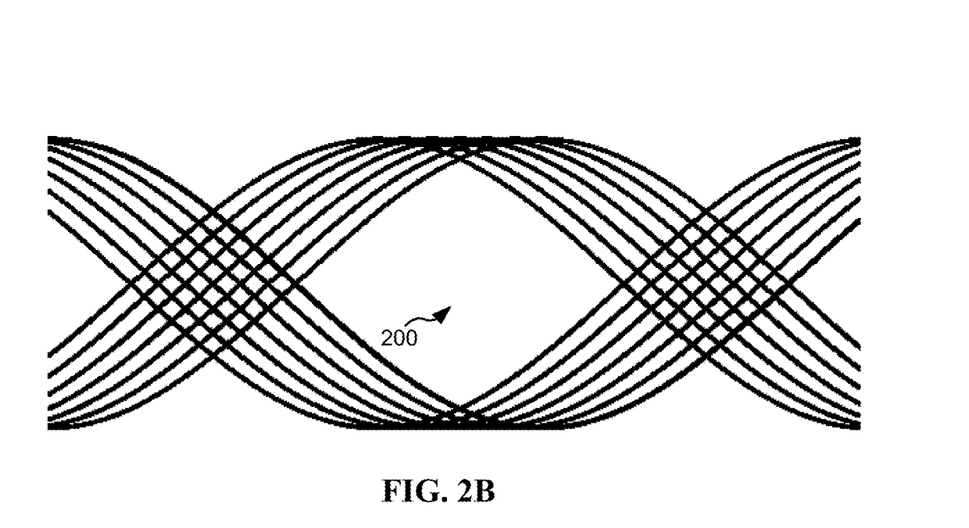
FIG. 2B depicts a diagram of an output signal, generated in response to an equalized input signal, after processing by a receive equalizer, according to various embodiments.

FIG. 2B depicts a diagram of an output signal, generated in response to an equalized input signal, after processing by a receive equalizer, according to various embodiments. The output signal can be the data stream 165 (FIG. 1), while the receive equalizer can be the equalizer 155. The diagram shown in FIG. 2A can be an eye diagram having an open eye 200. The signal shown in FIG. 2B and be generated from the signal shown in FIG. 2A by using a receive equalizer having receive equalizer coefficients selected according the techniques described herein.

FIG. 3 depicts a diagram of an example feed-forward equalizer 300, according to various embodiments. The feed-forward equalizer 300 is an example embodiment of the transmit equalizer 130 (FIG. 1). The feed-forward equalizer 300 includes delay elements 305, equalizer coefficients 310, and summation element 315. The delay elements 305 receive an input signal (e.g., a serial data stream such as the data stream 135 in FIG. 1) and generates delayed versions of the received signal. The delayed signals are then amplified (e.g., multiplied) in response equalizer coefficients 310 and added to the received input signal to generate an output signal 320 (e.g., the channel input signal 140 in FIG. 1). In some embodiments, the freed-forward equalizer 300 can be configured by programming the equalizer coefficients 310, as described herein. In some embodiments, the delay elements can be included in equalizer coefficients 310 and they may be programmed in substantially the same way as these coefficients.

FIG. 4 depicts a diagram of an example decision feedback equalizer 400, according to various embodiments. The decision feedback equalizer 400 is an example embodiment of the receive equalizer 155 (FIG. 1). The decision feedback equalizer 400 includes summation element 405, decision element 410, equalizer coefficients 415 and delay elements 420. The decision element 410 receives an input signal 402 from a communication channel and makes a decision 425 about the value of each symbol in the received signal. The delay elements 420 receive the decision 425 of the decision element 410 and generates delayed versions of the decision. The delayed version of the decisions are then amplified (e.g., multiplied) in response to equalizer coefficients 415 and added to the subsequently received portions (e.g., subsequent symbols) of the input 402. In some embodiments, the decision feedback equalizer 400 can be configured by programming the equalizer coefficients 310, as described herein. In certain embodiments, the delay elements can be included in equalizer coefficients 415 and programmed in substantially the same way as these coefficients.

Figure 5:
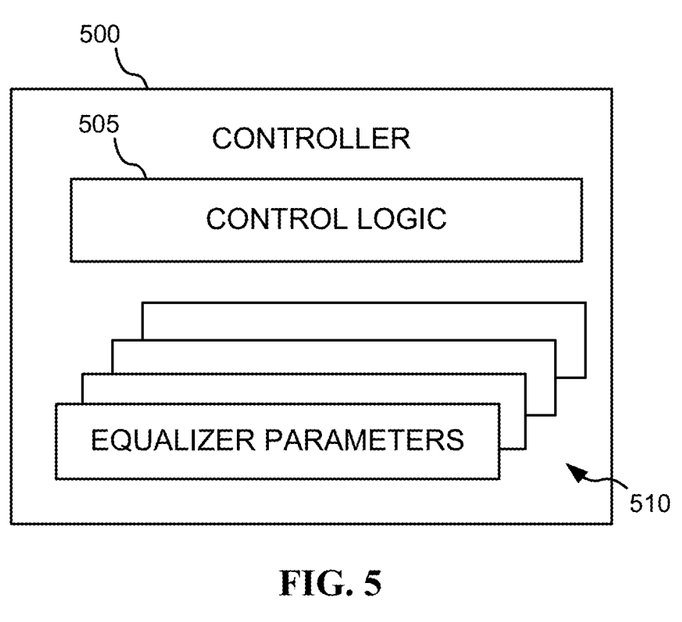
FIG. 5 depicts a diagram of a controller for system for providing data security using high speed equalization, according to various embodiments.

FIG. 5 depicts a diagram of an example controller 500 for a system for providing data security using high speed equalization, according to various embodiments. The controller 500 can be substantially similar to the controller 120 (FIG. 1) and the controller 150. The controller 500 can include control logic 505 and equalizer parameters 510. According to various embodiments, the control logic 505 include circuits, computer executable code, and other elements to execute the operations and techniques described herein.

Figure 6:
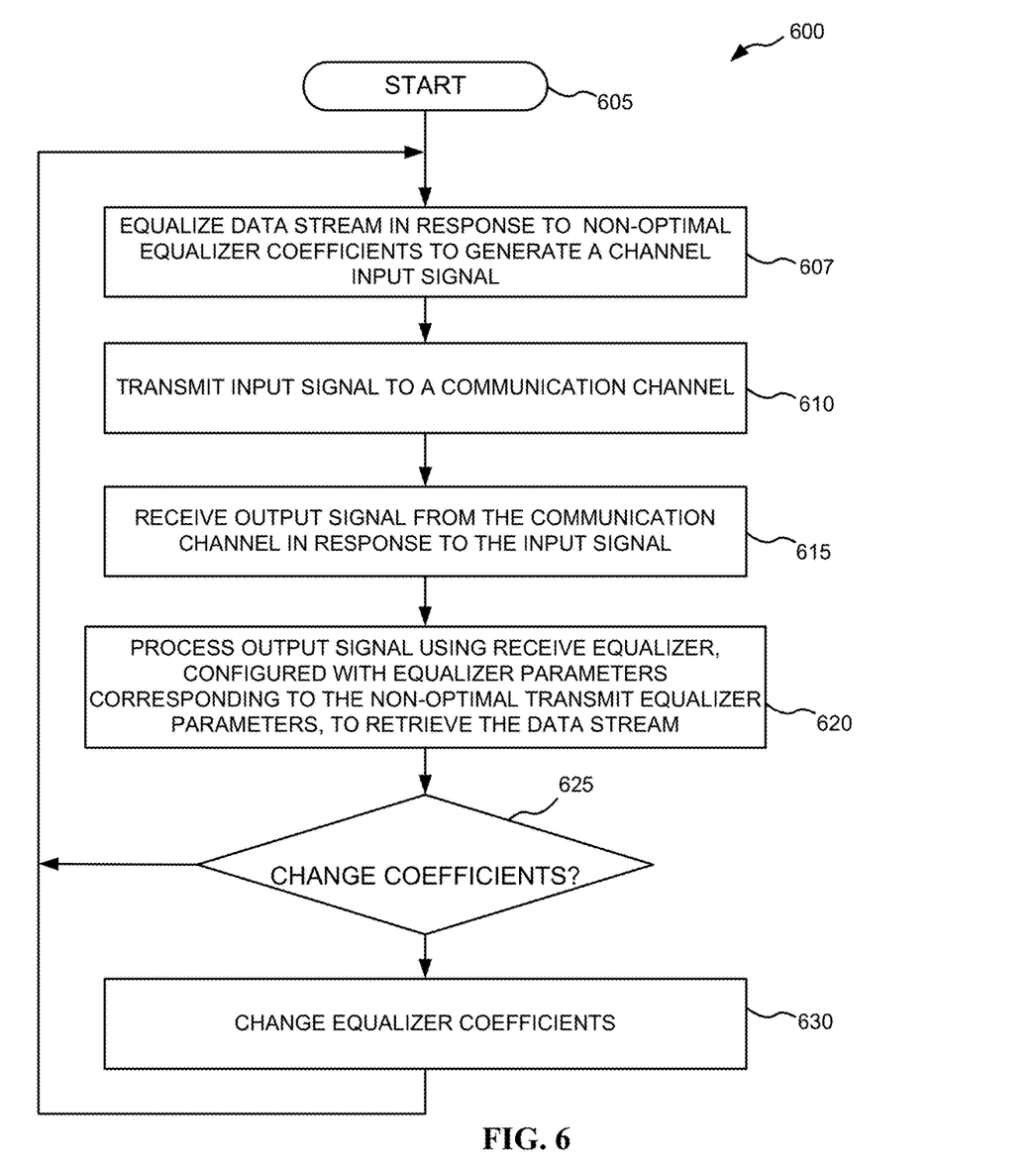
FIG. 6 depicts a flowchart of a set of operations for providing data security using high speed serial equalization, according to various embodiments.

FIG. 6 depicts a flowchart 600 of a set of operations for providing data security using high speed serial equalization, according to various embodiments. The operations of the flowchart 600 can be executed by a system, such as the system 100 (FIG. 1). In some embodiments, the system can begin the operations of the flowchart 600 by executing operation 605 to store a set non-optimal transmit equalizer coefficients and a set of receive equalizer coefficients in a memory associated with a transmit component and the receive component of the system, respectively. The transmit equalizer coefficients and receive equalizer coefficients can be selected as described herein. In certain embodiments, they system can further execute operation 605 by configuring a transmit equalizer with a first set of transmit equalizer coefficients and programming a corresponding receive equalizer with a first set of receive equalizer coefficients.

The system can execute operation 607 to equalize a data stream in response to non-optimal equalizer coefficients to generate a channel input signal. Executing operation 607 can include causing the transmit equalizer to receive an input data stream (e.g., a serial data stream) and equalize at least a first portion of the input data stream to generate the channel input signal, as described herein.

The system can execute operation 610 to transmit the input signal to a communication channel. The communication channel can be a high speed communication channel such as the communication channel 115 (FIG. 1). In some embodiments, the system can execute operation 610 by causing the transmit equalizer to transmit the channel input signal generated in operation 607 to the communication channel. In other embodiments, the system can execute operation 610 by cause the transmit equalizer to transmit the channel input signal to one or more signal conditioning circuits to further process the channel input signal before transmitting it to the communication channel.

The system can execute operation 615 to receive an output signal from the communication channel in response to the channel input signal.

The system can execute operation 620 to process the output signal received from the communication channel using a receive equalizer to retrieve (e.g., detect) the input data stream. In some embodiments, the receive equalizer can be a decision feedback equalizer configured with a set of equalizer parameters corresponding the non-optimal parameters used in operation 607.

The system can execute operation 625 to determine whether to change the transmit equalizer coefficients. The system can determine whether to change the transmit coefficients according to the techniques described herein. The system can, for example, change the transmit coefficients in response to the occurrence of a condition or triggering event. The condition or triggering event along with the transmit equalizer coefficients and the receive equalizer coefficients can be selected to both enable the receive equalizer to detect the input data stream from the output signal and reduce the likelihood of a circuit or structure external to the system detecting the input data stream from the output signal.

The system can continue operations 630 in response to determining to change the transmit equalizer coefficients, while the system can return to operation 607 in response to determining not to change the transmit equalizer coefficients.

The system can execute operation 630 to change the transmit equalizer coefficients to a second set (e.g., a different or new set) coefficients. The second set of transmit equalizer coefficients can be selected from the set of stored equalizer coefficients according to a predetermined sequence or pattern. In some embodiments, the system can additionally change the receive equalizer coefficients to synchronize these coefficients with the transmit equalizer coefficients, as described herein. The system can then return to operation 607 to continue processing the input data stream.

Figure 7:
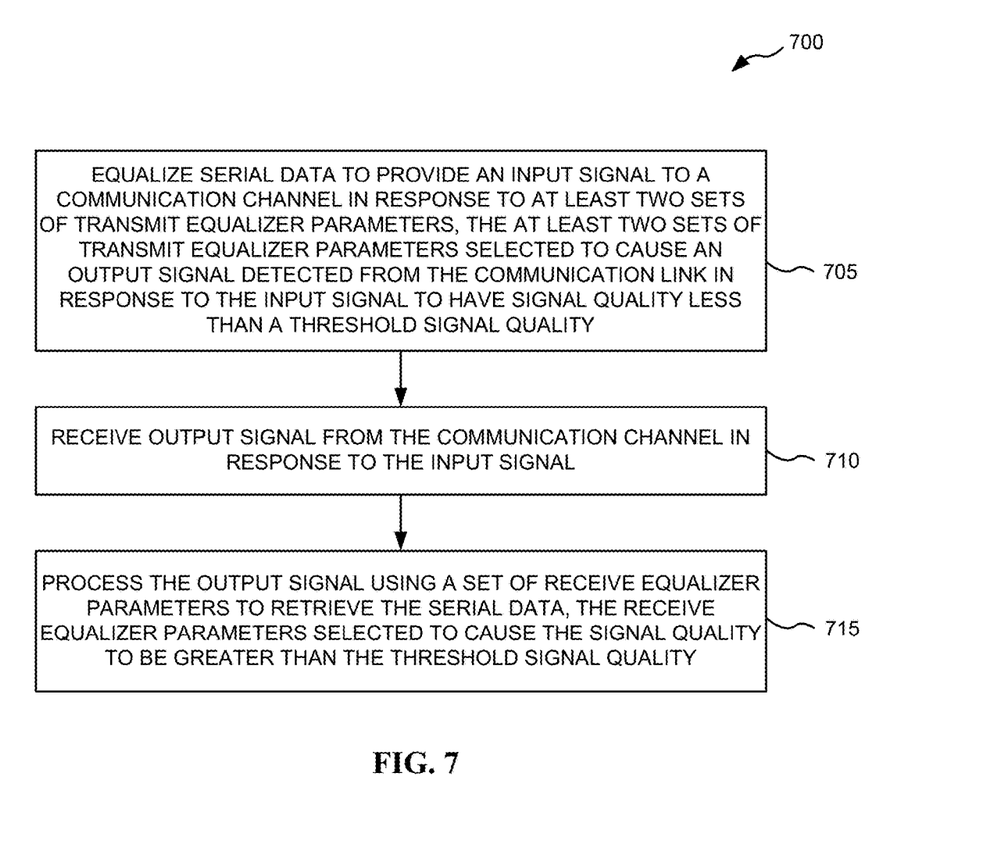
FIG. 7 depicts a flowchart of a set of operations for providing data security using high speed serial equalization, according to various embodiments.

FIG. 7 depicts a flowchart 700 of a set of operations for providing data security using high speed serial equalization, according to various embodiments. The operations of the flowchart 700 can be executed by a system, such as the system 100 (FIG. 1).

At operation 705, the system can equalize a serial data stream (e.g., serial data) to provide an input signal to a communication channel in response to at least two sets of transmit equalizer coefficients (e.g., parameters). The at least two sets of transmit equalizer coefficients can be selected to cause an output signal received from a communication channel in response to the input signal to have a signal quality less than a threshold signal quality. In some embodiments, signal quality can be determined using a calculated signal to noise ratio (SNR) determined from the output signal. In some embodiments, the signal quality can be determined by the calculated or determined height of an eye in an eye diagram generated from the output signal. In some embodiments, the signal quality threshold is selected to be lower than a signal quality level required for a circuit (e.g., an equalizer) to train to the output signal.

The system can execute operation 705 by equalizing a first portion of the serial data stream using a transmit equalizer configured with a first set of equalizer parameters selected from the at least two sets of equalizer parameters until a condition is satisfied. The system can then equalize a second portion of the serial data using a second set of transmit equalizer parameters subsequent to the condition being satisfied. In some embodiments, the system can change the sets of parameters used to process each portion of the input signal according to the techniques described herein.

At operations 710, the system can receive an output signal from the communication channel in response to the channel input signal.

At operation 715, the system can process the received output signal using a receive equalizer. The receive equalizer can be a decision feedback equalizer, such as the decision feedback equalizer 400 (FIG. 4). The receive equalizer can be configured with one or more sets of receive equalizer parameters selected to cause the signal quality of a signal, produced in response to processing the output signal, to have a signal quality greater than the threshold signal quality. The receive parameters can be predetermined and selected according the techniques and methods described herein.

Figure 8A:
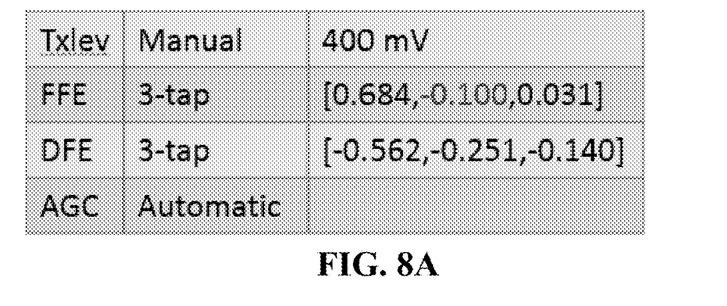
FIG. 8A depicts a diagram of example set of non-optimal feed-forward equalizer coefficients for a three tap transmit equalizer (e.g., an equalizer having three equalizer coefficients), according to various embodiments.

FIG. 8A depicts a diagram of example set of non-optimal feed-forward equalizer coefficients for a three tap transmit equalizer (e.g., an equalizer having three equalizer coefficients), according to various embodiments. The diagram additionally shows a corresponding set of decision feedback equalizer coefficients for a three tap receive equalizer, selected according the techniques described herein.

Figure 8B:
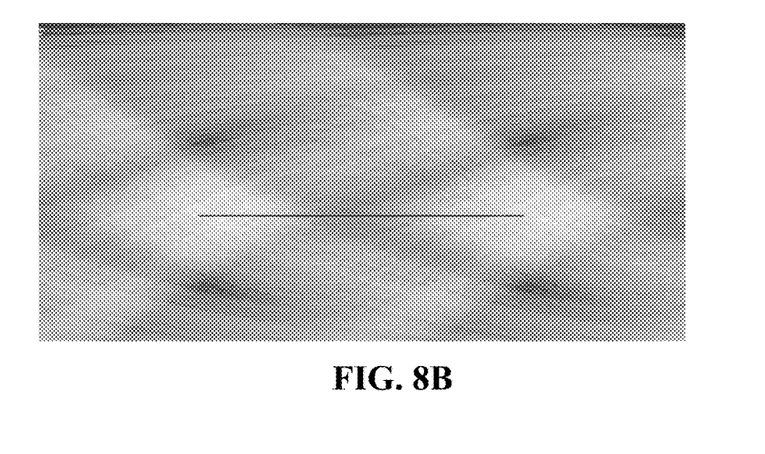
FIG. 8B depicts an eye diagram of an output signal detected at the input of a three tap decision feedback equalizer, according to various embodiments.

FIG. 8B depicts an eye diagram of an output signal detected at the input of a three tap decision feedback equalizer, according to various embodiments. The output signal was generated in response to a channel input signal transmitted by a feed-forward equalizer configured with the transmit equalizer coefficients shown in FIG. 8A. The diagram in FIG. 8B can be generated by changing the feed-forward equalizer coefficients while generating and transmitting the channel input signal, as described herein. The eye diagram at the input of decision feedback equalizer has a closed eye, indicating that an equalizer circuit or structure would have difficulty training to the output signal.

Figure 8C:
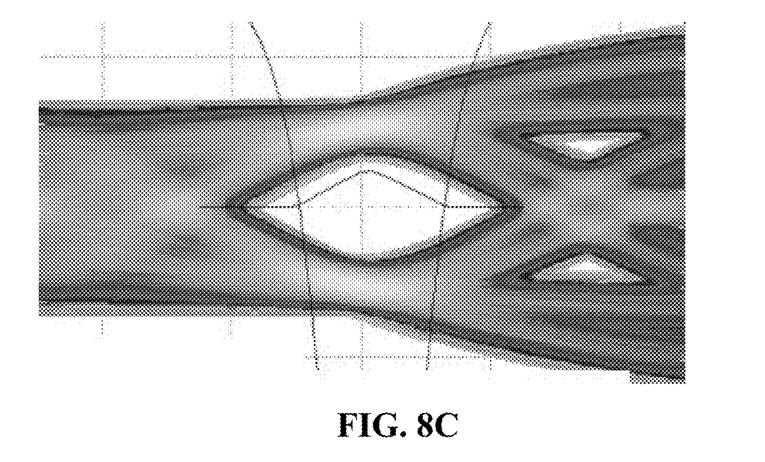
FIG. 8C depicts an eye diagram of a processed signal after an output signal is received from a communication channel is conditioned (e.g., equalized) by a decision feedback equalizer, according to various embodiments.

FIG. 8C depicts an eye diagram of a processed signal after an output signal is received from a communication channel is conditioned (e.g., equalized) by a decision feedback equalizer, according to various embodiments. The output signal is the same signal shown in FIG. 8B. While the decision feedback equalizer could not be trained to the output signal to open the eye in the eye diagram shown in FIG. 8B, a decision feedback equalizer configured with a set of predetermined equalizer coefficients selected to correspond with the transmit equalizer coefficients shown in FIG. 8A is able to readily open the eye, as shown in FIG. 8C.

Figure 9A:
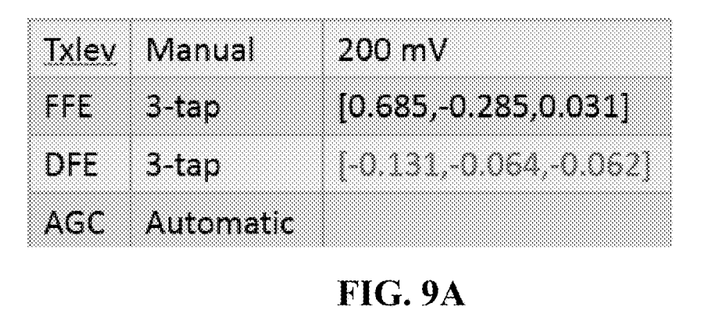
FIG. 9A depicts a diagram of example set of feed-forward equalizer coefficients for a three tap transmit equalizer (e.g., an equalizer having three equalizer coefficients), according to various embodiments.

FIG. 9A depicts a diagram of example set of feed-forward equalizer coefficients for a three tap transmit equalizer (e.g., an equalizer having three equalizer coefficients), according to various embodiments. The diagram additionally shows a corresponding set of decision feedback equalizer coefficients for a three tap receive equalizer, selected according the techniques described herein. The diagram further shows a transmit level for an input signal set to 200 mV (e.g., half the level of the input signal discussed in FIG. 8A-FIG. 8C).

Figure 9B:
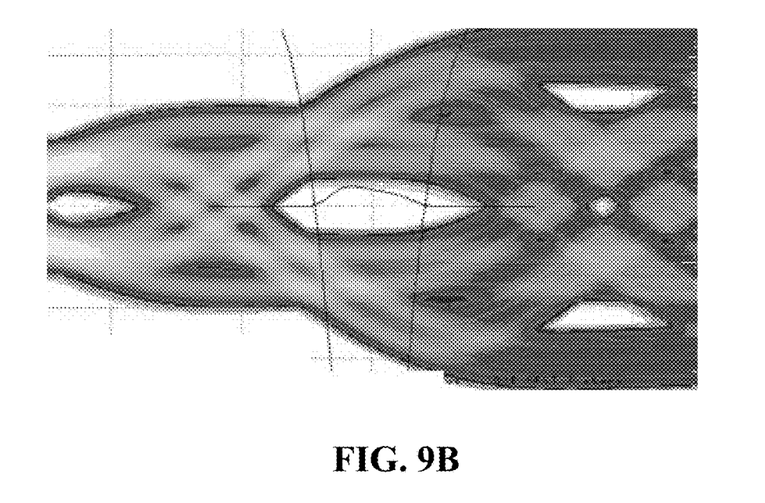
FIG. 9B depicts an eye diagram of a processed signal after an output signal sampled from a communication channel is conditioned (e.g., equalized) by a decision feedback equalizer, according to various embodiments.

FIG. 9B depicts an eye diagram of a processed signal after an output signal sampled from a communication channel is conditioned (e.g., equalized) by a decision feedback equalizer, according to various embodiments. The output signal was generated in response to a channel input signal transmitted by a feed-forward equalizer configured with the transmit equalizer coefficients shown in FIG. 9A and transmitted with 200 mV signal level. The output signal was conditioned in response to a set of receive equalizer parameters that were not selected to correspond to the transmit equalizer parameters shown in FIG. 9A. The diagram in FIG. 9B shows that a change the transmit signal level (e.g., the transmit signal amplitude) can reduce the height of an open eye to a level that would make it difficult to train a receive equalizer to detect a data stream transmitted in the output signal.

Figure 9C:
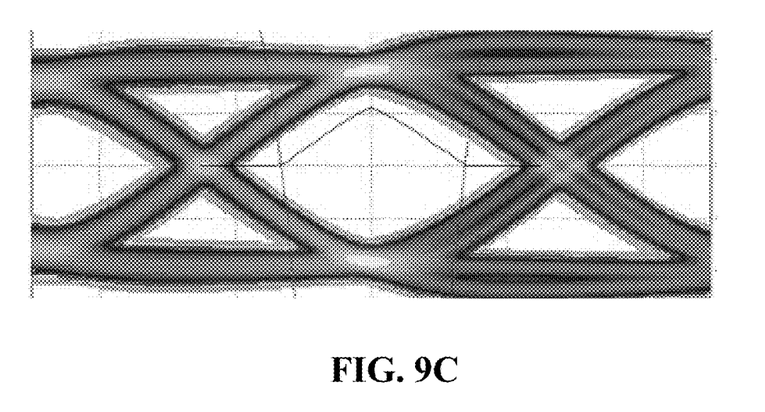
FIG. 9C depicts an eye diagram of a processed signal after an output signal sampled from a communication channel is conditioned (e.g., equalized) by a decision feedback equalizer, according to various embodiments.

FIG. 9C depicts an eye diagram of a processed signal after an output signal sampled from a communication channel is conditioned (e.g., equalized) by a decision feedback equalizer, according to various embodiments. The output signal was generated in response to a channel input signal transmitted by a feed-forward equalizer configured with the transmit equalizer coefficients shown in FIG. 9A and transmitted with 200 mV signal level. The output signal was conditioned in response to a set of receive equalizer parameters that were selected to correspond to the transmit equalizer parameters shown in FIG. 9A. While a decision feedback equalizer could not be trained to the output signal to generated in response to an input signal have the reduced 200 mV amplitude, a decision feedback equalizer configured with a set of predetermined equalizer coefficients selected to correspond with the transmit equalizer coefficients shown in FIG. 8A is able to readily improve the signal quality to enable detection of a data stream from the output signal, as shown in FIG. 9C.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, comprising:
    a transmit equalizer to transmit an input signal having serial data to a communication channel, the input signal equalized in response to transmit equalizer parameters to cause an output signal detected from the communication channel in response to the input signal to have a distortion level greater than a minimum distortion level, the transmit equalizer parameters having values that change in response to a condition, wherein the condition is an expiration of a time period, the time period being shorter than a threshold time period for a circuit external to the system to determine external equalizer parameters to process the output signal to retrieve the serial data; and
    a receive equalizer to receive the output signal from the communication channel and to process the received output signal to retrieve the serial data, the receive equalizer parameters selected in response to the transmit equalizer parameters to reduce the distortion level.

2. The system of claim 1, wherein the transmit equalizer parameters are selected based on characteristics of the communication channel to cause distortion level to reduce a likelihood of a circuit external to the system processing the output signal to retrieve the serial data.

3. The system of claim 1, wherein the transmit equalizer parameters are selected, based on characteristics of the communication channel, to cause the distortion level to increase an amount of time for a circuit external to the system processing the output signal to process output signal to retrieve the serial data.

4. The system of claim 1, wherein the transmit equalizer parameters are selected to vary a transmit level of the input signal.

5. A method, comprising:
    transmitting a transmit input signal having serial data to a communication channel, the input signal equalized in response to transmit equalizer parameters to cause an output signal detected from the communication channel in response to the input signal to have a distortion level greater than a minimum distortion level, the transmitted equalizer parameters having values that change in response to a condition, wherein the condition is an expiration of a time period, the time period being shorter than a threshold time period for a circuit external to the system to determine external equalizer parameters to process the output signal to retrieve the serial data;
    receiving the output signal from the communication channel; and
    processing the received output signal to retrieve the serial data, the received equalizer parameters selected in response to the transmitted equalizer parameters to reduce the distortion level.

* * * * *